United States Patent
Heo et al.

(10) Patent No.: US 11,153,495 B2
(45) Date of Patent: Oct. 19, 2021

(54) METHOD OF CONTROLLING PAN-TILT-ZOOM CAMERA BY USING FISHEYE CAMERA AND MONITORING SYSTEM

(71) Applicant: IDIS CO., LTD., Daejeon-si (KR)

(72) Inventors: Jun Hyeok Heo, Seongnam-si (KR); Chul Kim, Seongnam-si (KR)

(73) Assignee: IDIS CO., LTD., Daejeon-si (KR)

( * ) Notice: Subject to any disclaimer, the term of this patent is extended or adjusted under 35 U.S.C. 154(b) by 0 days.

(21) Appl. No.: 16/801,196

(22) Filed: Feb. 26, 2020

(65) Prior Publication Data
US 2020/0382712 A1    Dec. 3, 2020

(30) Foreign Application Priority Data
May 31, 2019    (KR) ........................ 10-2019-0064557

(51) Int. Cl.
| | |
|---|---|
| *H04N 5/232* | (2006.01) |
| *G06T 7/73* | (2017.01) |
| *G06T 3/00* | (2006.01) |
| *G08B 13/196* | (2006.01) |
| *H04N 7/18* | (2006.01) |

(52) U.S. Cl.
CPC ....... *H04N 5/23299* (2018.08); *G06T 3/0018* (2013.01); *G06T 7/73* (2017.01); *G08B 13/1963* (2013.01); *G08B 13/19628* (2013.01); *G08B 13/19643* (2013.01); *H04N 5/23216* (2013.01); *H04N 5/23296* (2013.01); *H04N 7/181* (2013.01)

(58) Field of Classification Search
CPC .......... G08B 13/19643; G08B 13/1963; G08B 13/19628; H04N 5/23299
See application file for complete search history.

(56) References Cited

U.S. PATENT DOCUMENTS

| | | | | |
|---|---|---|---|---|
| 6,215,519 B1* | 4/2001 | Nayar | ............. | G08B 13/19608 348/148 |
| 6,812,835 B2* | 11/2004 | Ito | .................... | G08B 13/19604 340/541 |

(Continued)

FOREIGN PATENT DOCUMENTS

| | | |
|---|---|---|
| CN | 105516661 B | 3/2019 |
| JP | 2004320175 A * | 11/2004 |

(Continued)

OTHER PUBLICATIONS

Korean office action dated Jun. 15, 2020 for Korean Application No. 10-2019-0064557.

(Continued)

*Primary Examiner* — John Villecco
(74) *Attorney, Agent, or Firm* — Seung Ho Lee (57) ABSTRACT

Provided is a monitoring system and a method of controlling a panning-tilt zoom (PTZ) camera by using a fisheye camera when the fisheye camera and the PTZ camera are adjacently installed. The method includes selecting a region of interest (ROI) in an entire surveillance-target area image captured by the fisheye camera and adjusting a panning angle P and a tilting angle T of the PTZ camera to acquire an accurate image of the selected ROI.

5 Claims, 12 Drawing Sheets

(56) References Cited

U.S. PATENT DOCUMENTS

| | | | | |
|---|---|---|---|---|
| 6,839,067 | B2* | 1/2005 | Liu | G08B 13/19643 345/647 |
| 6,977,676 | B1* | 12/2005 | Sato | H04N 5/23206 348/211.11 |
| 7,301,557 | B2* | 11/2007 | Kakou | G08B 13/19602 348/36 |
| 7,479,979 | B2* | 1/2009 | Kakou | G08B 13/19602 348/143 |
| 7,529,424 | B2* | 5/2009 | Ahiska | H04N 5/217 348/335 |
| 7,636,105 | B2* | 12/2009 | Sun | H04N 17/002 348/169 |
| 7,884,849 | B2* | 2/2011 | Yin | G08B 13/19643 348/143 |
| 8,355,046 | B2* | 1/2013 | Fujii | H04N 7/181 348/159 |
| 8,390,686 | B2* | 3/2013 | Tanaka | G08B 13/19628 348/159 |
| 8,405,732 | B2* | 3/2013 | Ahiska | H04N 5/247 348/211.3 |
| 8,488,001 | B2* | 7/2013 | Mohanty | H04N 7/181 348/159 |
| 9,313,400 | B2* | 4/2016 | Chen | H04N 7/18 |
| 9,497,388 | B2* | 11/2016 | Huang | H04N 5/247 |
| 9,762,864 | B2* | 9/2017 | Norland | H04N 7/181 |
| 10,425,566 | B2* | 9/2019 | Hansson | H04N 17/002 |
| 10,529,050 | B2 | 1/2020 | Song et al. | |
| 10,848,685 | B2* | 11/2020 | Yokomizo | G08B 13/19643 |
| 2003/0160863 | A1* | 8/2003 | Kakou | G08B 13/19602 348/46 |
| 2005/0134685 | A1* | 6/2005 | Egnal | H04N 7/181 348/157 |
| 2005/0231589 | A1* | 10/2005 | Chiang | H04N 7/181 348/36 |
| 2006/0028548 | A1 | 2/2006 | Salivar et al. | |
| 2006/0056056 | A1 | 3/2006 | Ahiska et al. | |
| 2006/0203090 | A1* | 9/2006 | Wang | G08B 13/1963 348/143 |
| 2006/0209186 | A1* | 9/2006 | Iyoda | G06T 7/80 348/142 |
| 2010/0141767 | A1* | 6/2010 | Mohanty | G08B 13/19643 348/159 |
| 2011/0310219 | A1* | 12/2011 | Kim | H04N 5/247 348/36 |
| 2012/0038776 | A1* | 2/2012 | Ahiska | G08B 13/19608 348/159 |
| 2012/0169882 | A1* | 7/2012 | Millar | G08B 13/19608 348/159 |
| 2013/0258115 | A1* | 10/2013 | Hansson | G06T 7/80 348/187 |
| 2014/0104376 | A1* | 4/2014 | Chen | G08B 13/19643 348/36 |
| 2014/0160235 | A1* | 6/2014 | Norland | H04N 7/181 348/37 |
| 2016/0364863 | A1* | 12/2016 | Hansson | H04N 5/23299 |
| 2018/0343435 | A1 | 11/2018 | Mizuno | |

FOREIGN PATENT DOCUMENTS

| | | | | |
|---|---|---|---|---|
| KR | 101019384 B1 | * | 3/2011 | |
| KR | 20110044101 A | * | 4/2011 | |
| KR | 20110094664 A | * | 8/2011 | |
| KR | 10-2014-0121345 A | | 10/2014 | |
| KR | 10-2018-0034118 A | | 4/2018 | |
| KR | 10-2018-0129667 A | | 12/2018 | |
| WO | WO-2008079862 A1 | * | 7/2008 | ....... G08B 13/19632 |
| WO | WO-2009066988 A2 | * | 5/2009 | ....... G08B 13/19608 |
| WO | 2012151777 A | | 11/2012 | |

OTHER PUBLICATIONS

European Search Report dated Sep. 18, 2020 for European Application No. 20162008.5.

* cited by examiner

METHOD OF CONTROLLING PAN-TILT-ZOOM CAMERA BY USING FISHEYE CAMERA AND MONITORING SYSTEM

CROSS-REFERENCE TO RELATED APPLICATION(S)

This application claims priority from Korean Patent Application No. 10-2019-0064557, filed on May 31, 2019, in the Korean Intellectual Property Office, the disclosure of which is incorporated herein by reference in its entirety.

BACKGROUND

1. Field

The following description relates to a monitoring system and more particularly, to a monitoring system for simultaneously monitoring an entire surveillance-target area and a specific area in the surveillance-target area by using two surveillance cameras and an operating method thereof.

2. Description of Related Art

In societies which are becoming more complicated, surveillance cameras are used as the most effective tools for recording and checking crimes that are increasing day by day and everyday human activities. Although surveillance cameras have drawbacks, such as the infringement of privacy, the necessity and importance of surveillance cameras are increasing, and the demand for surveillance cameras is steeply increasing.

Lately, camera systems which monitor an entire surveillance-target area by using a fisheye lens camera and precisely monitor a specific area designated in the surveillance-target area by using a pan-tilt-zoom (PTZ) camera have been commercialized.

As an example, AXIS corp. commercialized a special product in which a fisheye lens is installed directly below a PTZ camera to align the optical axes thereof. However, this product may impose considerable instrumental restrictions on PTZ camera development for night monitoring such as addition of an infrared (IR) light-emitting diode (LED). Also, it is not possible to use various PTZ cameras and fisheye lens cameras in combination, and thus diversity is degraded.

As another example, VIVOTEK corp. developed a system which acquires many images by adjusting the pan and tilt of a PTZ camera several times, generates two distorted semicircular images by merging the acquired images like an image acquired from a fisheye lens camera, generates a lookup table for control by causing a user to select at least 50 locations which are substantially the same between both the distorted semicircular images, and controls the PTZ camera by using the lookup table. When a camera is installed in this system, a user should select 50 or more points between two images in a calibration operation, which is complicated. In a process of automatically generating a PTZ image similar to a fisheye lens image, when a user indicates 50 matching points for mapping, PTZ values of fisheye lens image points are stored on the basis of the matching points, and when a specific point is selected in the fisheye lens image, PTZ is controlled to provide an image.

In addition to the combination of a fisheye lens and a PTZ camera, the calibration of a plurality of cameras is actually an old research theme in the computer vision field. However, most solutions employ a calibration board or the like which is aware of actual geometric characteristics and thus are difficult to apply to an actual closed-circuit television (CCTV) installation site.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a monitoring system for automatically controlling a panning angle, a tilting angle, and a zoom distance of a pan-tilt-zoom (PTZ) camera by easily using a fisheye camera image without a complicated calibration process, and a method of controlling the PTZ camera by using a fisheye camera in the system.

In one general aspect, a method of controlling a PTZ camera by using a fisheye camera when the fisheye camera and the PTZ camera are adjacently installed includes selecting a region of interest (ROI) in an entire surveillance-target area image captured by the fisheye camera and adjusting a panning angle P and a tilting angle T of the PTZ camera to acquire an accurate image of the selected ROI. The adjusting of the panning angle P and the tilting angle T may include adjusting the panning angle P and the tilting angle T of the PTZ camera first so that an optical axis of the PTZ camera may be parallel with an optical axis of the fisheye camera directed to a center of the ROI and, after the panning angle P and the tilting angle T are adjusted first, adjusting the panning angle P and the tilting angle T of the PTZ camera second on the basis of a distance value between a center of the ROI in an image captured by the PTZ camera and a center of the PTZ camera image.

In an additional aspect, the first adjusting of the panning angle P and the tilting angle T may include de-warping an image having a certain range from the ROI selected in the entire surveillance-target area image captured by the fisheye camera, calculating a panning angle and a tilting angle of the optical axis of the PTZ camera directed to the center of the ROI of the fisheye camera from the de-warped image, and adjusting the panning angle P and the tilting angle T of the PTZ camera first so that the optical axis of the PTZ camera may be parallel with the optical axis of the fisheye camera directed to the center of the ROI indicated by the panning angle and the tilting angle.

In an additional aspect, the first adjusting of the panning angle P and the tilting angle T may include adjusting the panning angle P and the tilting angle T of the PTZ camera first by considering a difference value between reference coordinates of the fisheye camera stored when the fisheye camera is installed and reference coordinates of the PTZ camera stored when the PTZ camera is installed.

In an additional aspect, the second adjusting of the panning angle P and the tilting angle T may include acquiring an ROI image captured by the PTZ camera whose panning angle P and tilting angle T have been adjusted first, calculating a distance between centers of the ROI image captured by the PTZ camera and the de-warped image by matching the ROI image to the de-warped image, and adjusting the panning angle P and the tilting angle T of the PTZ camera second on the basis of the calculated distance.

In another general aspect, a monitoring system includes a fisheye camera configured with a fisheye lens to monitor an entire surveillance-target area, a PTZ camera installed adjacent to the fisheye camera and configured to closely monitor a specific location of the surveillance-target area, and a controller configured to have an ROI selected in an image of the entire surveillance-target area captured by the fisheye camera and adjust a panning angle P and a tilting angle T of the PTZ camera in order to acquire an accurate image of the selected ROI. The controller may adjust the panning angle P and the tilting angle T of the PTZ camera first so that an optical axis of the PTZ camera may be parallel with an optical axis of the fisheye camera directed to a center of the ROI and adjust the panning angle P and the tilting angle T of the PTZ camera second on the basis of a distance value between a center of the ROI in an image captured by the PTZ camera and a center of the PTZ camera image after the panning angle P and the tilting angle T are adjusted first.

Other features and aspects will be apparent from the following detailed description, the drawings, and the claims.

BRIEF DESCRIPTION OF THE DRAWINGS

FIGS. 6A and 6B show examples of images illustrating an ROI range as a PTZ camera zooms in.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, exemplary embodiments of the present invention will be described in detail with reference to the accompanying drawings. However, exemplary embodiments of the present invention set forth herein can be modified in various different forms, and the scope of the present invention is not limited thereto. The exemplary embodiments of the present invention are provided to fully describe the present invention to those of ordinary skill in the art.

Figure 1:
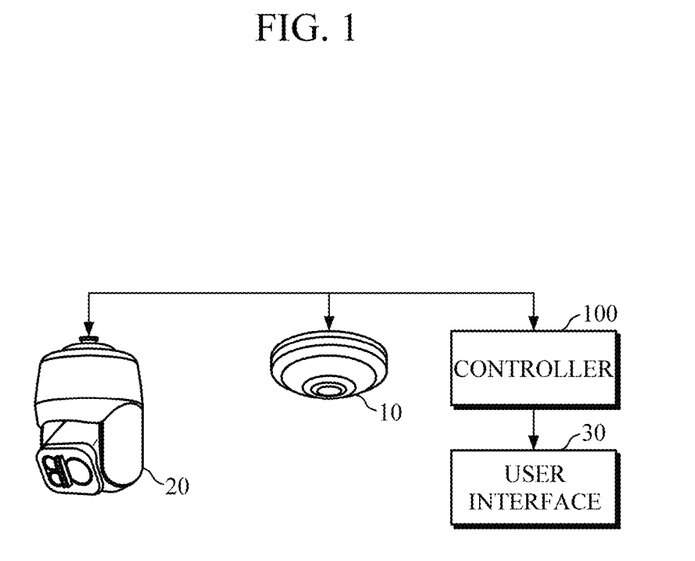
FIG. 1 schematically shows a configuration of a monitoring system in which a method of controlling a pan-tilt-zoom (PTZ) camera by using a fisheye camera is performed according to an exemplary embodiment of the present invention.

FIG. 1 schematically shows a configuration of a monitoring system in which a method of controlling a pan-tilt-zoom (PTZ) camera by using a fisheye camera is performed according to an exemplary embodiment of the present invention.

Referring to FIG. 1, a monitoring system is implemented by connecting a fisheye camera 10, a 5 PTZ camera 20, a user interface 30, and a controller 100 through wired or wireless communication.

First, the fisheye camera 10 functions to monitor an entire surveillance-target area. A fisheye lens may be installed in the fisheye camera 10 to image an entire horizontal area downward. However, with the resolution of the fisheye camera 10 having a limited number of pixels, it is difficult to acquire the accurate shape of a subject. In other words, the fisheye camera 10 generally provides a clear image of a subject captured at the center of the screen (see FIG. 3) because the fisheye camera 10 is not far away from the subject. However, an image of a subject captured in pixels far away from the center of the screen is warped and unclear because the subject is far away from the fisheye camera 10.

To solve this problem, according to the present invention, the PTZ camera 20 functions to clearly image a subject in a specific area.

In other words, according to the present invention, a region of interest (ROI) may be located by using the fisheye camera 10, and then the ROI may be closely monitored by using the PTZ camera 20.

In this case, the controller 100 calculates a panning angle and a tilting angle of the PTZ camera 20 so that the PTZ camera 20 may be directed toward the ROI and generates a control signal corresponding to the panning angle P and the tilting angle T. The PTZ camera 20 changes a panning angle P and a tilting angle T thereof according to the control signal.

Here, the panning angle P refers to the angle of a straight line between the PTZ camera 20 and a subject with respect to a reference point (0 degrees) assuming that the PTZ camera 20 and the subject are coplanar. In other words, the subject and the PTZ camera 20 are disposed at the single panning angle P among 0 degrees to 360 degrees. Therefore, the PTZ camera 20 is rotated in a horizontal plane according to the panning angle P.

The tilting angle T refers to the angle between a straight line extending from the PTZ camera 20 and crossing the ground surface at right angles and the straight line between the PTZ camera 20 and the subject. The tilting angle T varies according to the distance between the subject and the PTZ camera 20. For example, when the subject is disposed vertically below the PTZ camera 20, the tilting angle T is 0 degrees. As the subject becomes farther away from the PTZ camera 20, the tilting angle T gradually increases. When the subject is considerably far away from the PTZ camera 20, the tilting angle T approximates to 90 degrees. In other words, the tilting angle T ranges from 0 degrees to less than 90 degrees.

According to an exemplary embodiment of the present invention, the fisheye camera 10 and the PTZ camera 20 are not integrated in one camera module but are separate pieces of equipment which are separate camera modules and installed as close to each other as possible. In this case, according to characteristics of an installation space, the fisheye camera 10 and the PTZ camera 20 may be installed so that reference coordinates (0 degrees) of the fisheye camera 10 and reference coordinates (0 degrees) of the PTZ camera 20 may correspond to each other or may not correspond to each other but may roll with respect to each other.

However, the present invention relates to a method of controlling the fisheye camera 10 and the PTZ camera 20 in association with each other. Consequently, it is necessary to measure and provide a difference value between the reference coordinates (0 degrees) of the installed fisheye camera 10 and the reference coordinates (0 degrees) of the PTZ camera 20 to the controller 100 in advance. Then, when adjusting the panning angle P and the tilting angle T of the PTZ camera 20, particularly, in first adjusting of the panning angle P and the tilting angle T which will be described below, the controller 100 may accurately control the panning angle P and the tilting angle T by considering the difference value between the reference coordinates (0 degrees) of the fisheye camera 10 and the reference coordinates (0 degrees) of the PTZ camera 20. This will be described below with reference to FIG. 2.

The user interface 30 is a means for outputting a still image or a moving image captured by the fisheye camera 10 and the PTZ camera 20 and generating manipulation information of a user as key data for the controller 100. As the user interface 30, a manipulator and a display may be separately implemented or integrated in the form of a touch screen. According to an exemplary embodiment of the present invention, a fisheye camera image is output to the user interface 30 so that an ROI may be selected by the user and output to the controller 100.

The controller 100 controls each of the above-described components. Specifically, the controller 100 may output an image received from the fisheye camera 10 to the user interface 30. When an ROI selection signal is input through the user interface 30, the controller 100 may control the PTZ camera 20 to rotate to or zoom in on the ROI by transmitting a control signal for adjusting the panning angle P, the tilting angle T, and a zoom distance Z of the PTZ camera 20 to the PTZ camera 20. In this way, the user is enabled to closely monitor the ROI through the image captured by the PTZ camera 20.

A method of controlling a PTZ camera by using a fisheye camera in the above-described monitoring system will be described in detail with reference to FIGS. 2 to 9.

Figure 2:
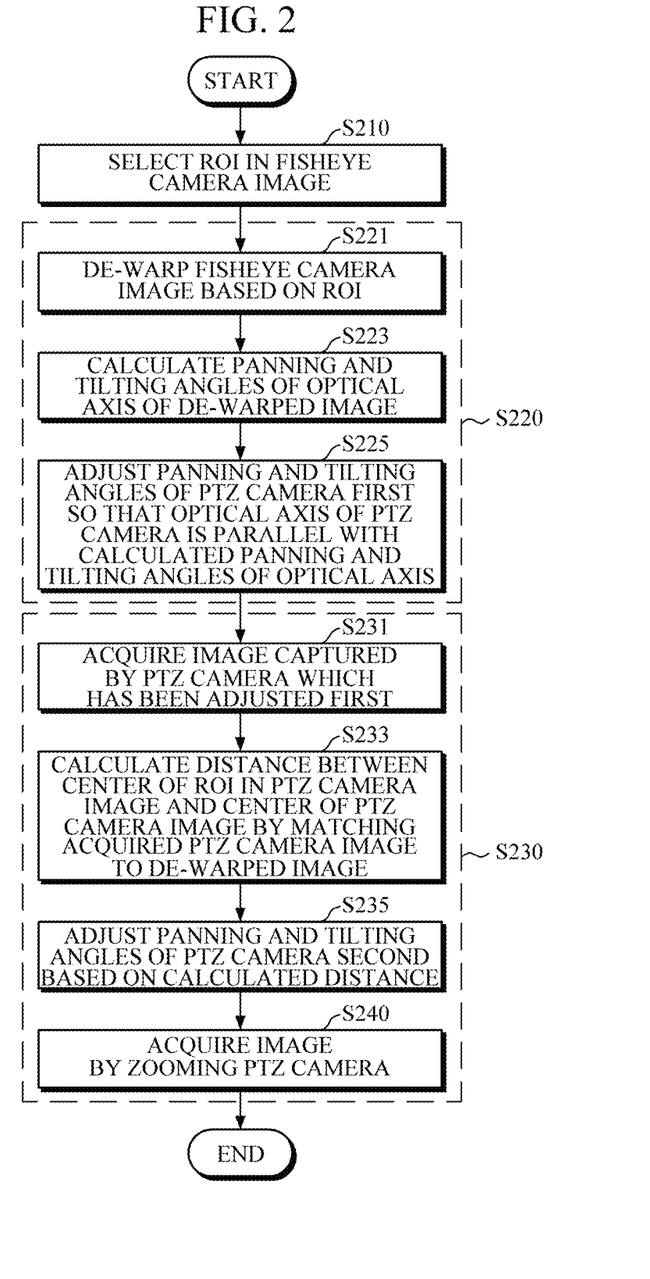
FIG. 2 is a flowchart illustrating a method of controlling a PTZ camera by using a fisheye camera according to an exemplary embodiment of the present invention.
Figure 3:
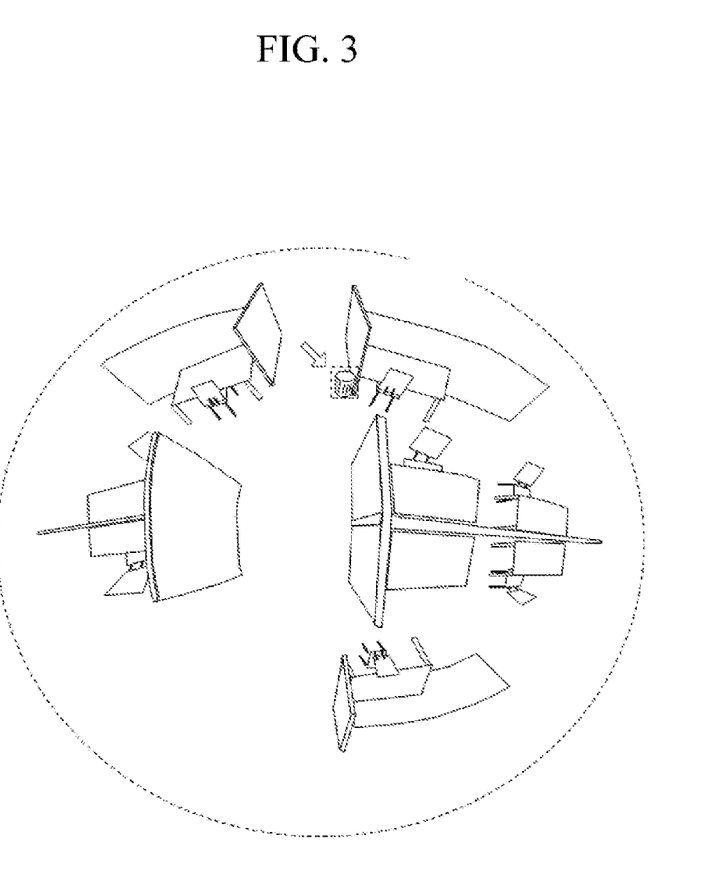
FIG. 3 shows an example of an entire surveillance-target area image captured by a fisheye camera.
Figure 4A:
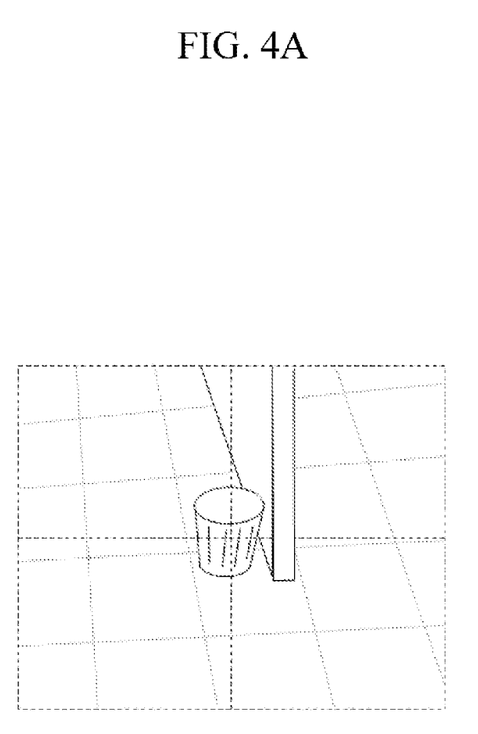
FIGS. 4A and 4B show examples of region of interest (ROI) images.
Figure 4B:
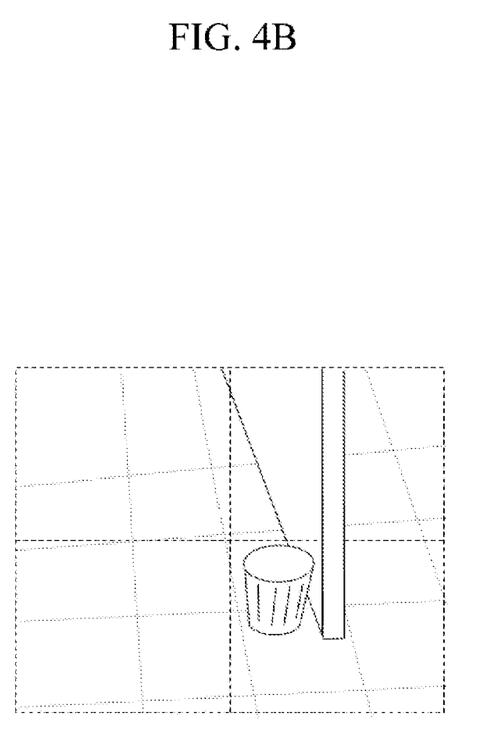

FIG. 2 is a flowchart illustrating a method of controlling a PTZ camera by using a fisheye camera according to an exemplary embodiment of the present invention, FIG. 3 shows an example of an entire surveillance-target area image captured by a fisheye camera, and FIGS. 4A and 4B show examples of ROI images.

First, the controller 100 acquires a fisheye camera image of an entire surveillance-target area by operating the fisheye camera 10 and provides the fisheye camera image to the user interface 30. In other words, a fisheye camera image is output as shown in FIG. 3.

In this case, a user may select an ROI in the entire surveillance-target area and request an image of the ROI captured by the PTZ camera 20.

When an ROI is selected in the fisheye camera image by the user (S210), the controller 100 adjusts the panning angle P and the tilting angle T of the PTZ camera 20 to acquire an accurate image of the selected ROI. According to an exemplary embodiment of the present invention, the controller 100 adjusts the panning angle P and the tilting angle T of the PTZ camera 20 two times.

The controller 100 adjusts the panning angle P and the tilting angle T of the PTZ camera 20 first so that an optical axis of the PTZ camera 20 may be parallel with an optical axis of the fisheye camera 10 directed to the centered of the ROI (S220).

Specifically, the controller 100 de-warps an image having a certain range from the ROI selected by the user in the entire surveillance-target area image captured by the fisheye camera 10 (S221). In other words, a de-warped image having a certain range from a trashcan which is an object of interest selected by the user is generated from the entire surveillance-target area image shown in FIG. 3. The de-warped image may be an image centered on the trashcan as shown in FIG. 4A.

The controller 100 calculates a panning angle and a tilting angle of an optical axis directed to the center of the ROI of the fisheye camera 10 from the de-warped image (S223). In other words, a panning angle and a tilting angle of the center of the ROI are calculated on the basis of the reference coordinates (0 degrees) of the fisheye camera 10.

Subsequently, the controller 100 generates a control signal for adjusting the panning angle P and the tilting angle T of the PTZ camera 20 so that an optical axis of the PTZ camera 20 may be parallel with an optical axis directed to the center of the ROI indicated by the panning angle and the tilting angle of the center of the ROI on the basis of the reference coordinates (0 degrees) of the fisheye camera 10 (S225). In this case, the controller 100 has stored a difference value between the reference coordinates (0 degrees) of the fisheye camera 10 and the reference coordinates (0 degrees) of the PTZ camera 20 acquired upon installation, and thus the panning angle P and the tilting angle T of the PTZ camera 20 are adjusted first by considering the difference value in S225.

After the panning angle P and the tilting angle T are adjusted first as described above, an image of the ROI captured by the PTZ camera 20 may be the same as an image shown in FIG. 4B.

Comparing the images shown in FIGS. 4A and 4B, the centers do not correspond to each other. This is because the fisheye camera 10 and the PTZ camera 20 are not integrated and are installed a certain distance away from each other as separate pieces of equipment. This will be described in further detail with reference to FIG. 5.

Figure 5:
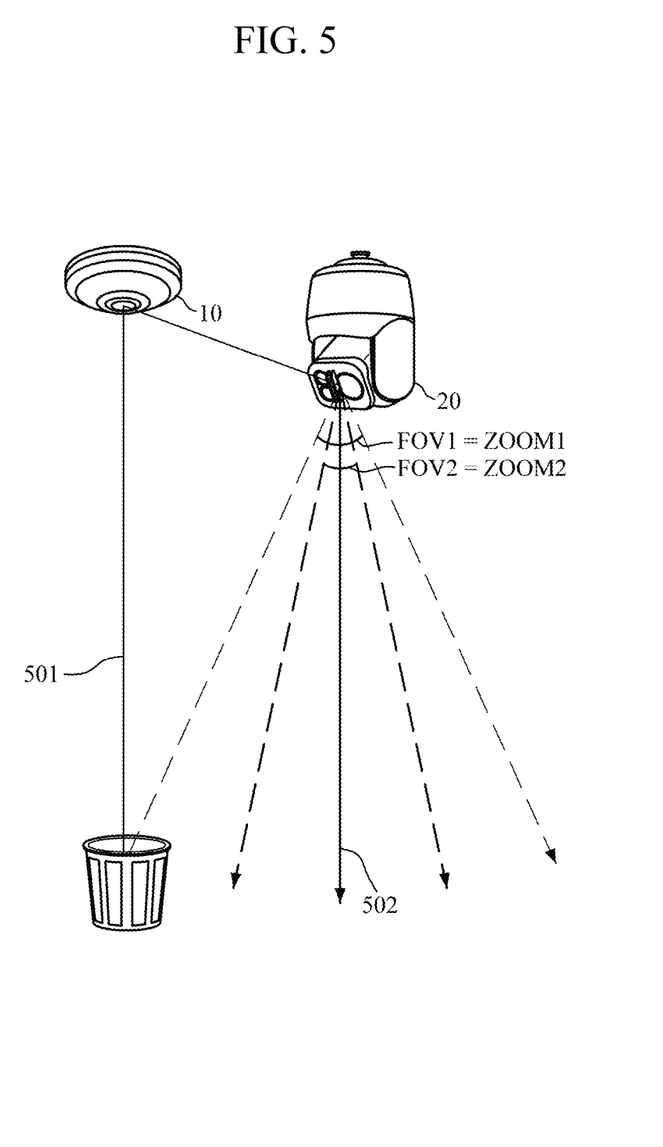
FIG. 5 is a diagram illustrating optical axes of a fisheye camera and a PTZ camera with respect to an ROI according to an exemplary embodiment of the present invention.

FIG. 5 is a diagram illustrating optical axes of a fisheye camera and a PTZ camera with respect to an ROI according to an exemplary embodiment of the present invention.

Referring to FIG. 5, due to the first adjustment of the panning angle P and the tilting angle T of the PTZ camera 20, an optical axis 501 of the fisheye camera 10 and an optical axis 502 of the PTZ camera 20 toward an object of interest do not correspond to each other but are parallel to each other at a certain distance. Consequently, the centers of the images shown in FIGS. 4A and 4B do not correspond to each other.

In this situation, a user may request the PTZ camera 20 to zoom in and image the ROI through the user interface 30 in order to monitor the ROI more closely. As shown in FIG. 5, the object of interest is imaged when the PTZ camera 20 has a viewing angle FOV1 at a zoom level 1 but is not shown when the PTZ camera 20 has a viewing angle FOV2 at a zoom level 2.

Figure 6A:
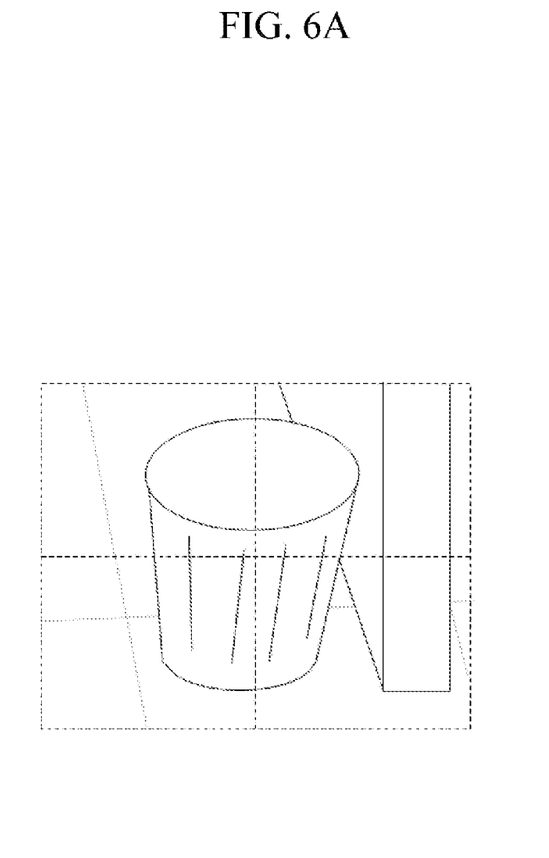
Figure 6B:
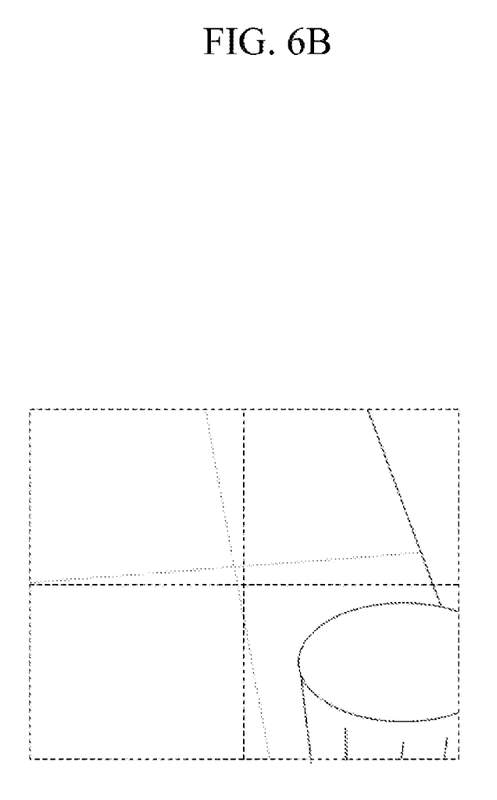

FIG. 6A and FIG. 6B show examples of images illustrating an ROI range as a PTZ camera zooms in.

In the above case, the user may request enlargement expecting an image of the object of interest as shown in FIG. 6A, but an image may be captured in which an area other than the object of interest is enlarged as shown in FIG. 6B.

Therefore, referring back to FIG. 2, the controller 100 adjusts the panning angle P and the tilting angle T of the PTZ camera 20 second on the basis of the distance between the center of an ROI image captured by the PTZ camera 20 and the center of the de-warped fisheye image according to an exemplary embodiment of the present invention.

Specifically, the controller 100 acquires an ROI image captured by the PTZ camera 20 whose panning angle P and tilting angle T have been adjusted first (S231). The ROI image may be the image shown in FIG. 4B.

The controller 100 calculates the distance between the center of the ROI in the PTZ camera image and the center of the PTZ camera image by matching the acquired PTZ camera image to the de-warped image.

Figure 7A:
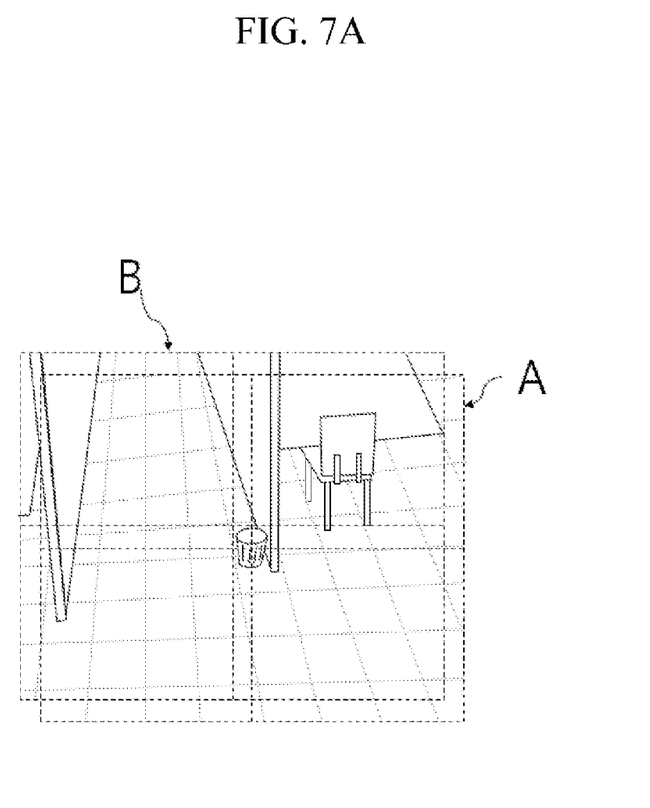
FIGS. 7A and 7B are a set of pictures illustrating matching between images of a fisheye camera and a PTZ camera.
Figure 7B:
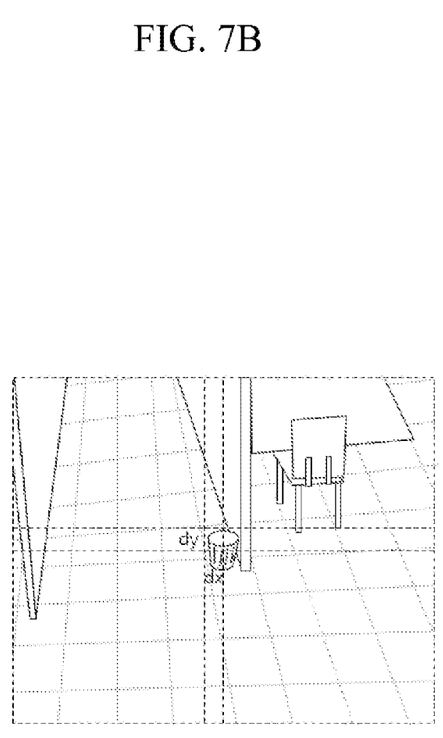

FIG. 7A and FIG. 7B are a set of pictures illustrating matching between images of a fisheye camera and a PTZ camera.

In other words, as shown in FIG. 7A, the controller 100 detects an appropriately large area based on the center of the de-warped image (hereinafter "image A") of the fisheye camera 10 in an image captured by the PTZ camera 20 (hereinafter "image B") through image matching. Subsequently, the controller 100 calculates a horizontal migration distance dx and a vertical migration distance dy of the center of image A detected in image B.

Subsequently, the controller 100 calculates a panning angle Ø and a tilting angle θ of the PTZ camera 20, which will be corrected, by using the calculated horizontal distance dx and vertical distance dy through [Equation 1] to [Equation 4] below and adjusts the panning angle P and the tilting angle T of the PTZ camera 20 second (S235).

Figure 8:
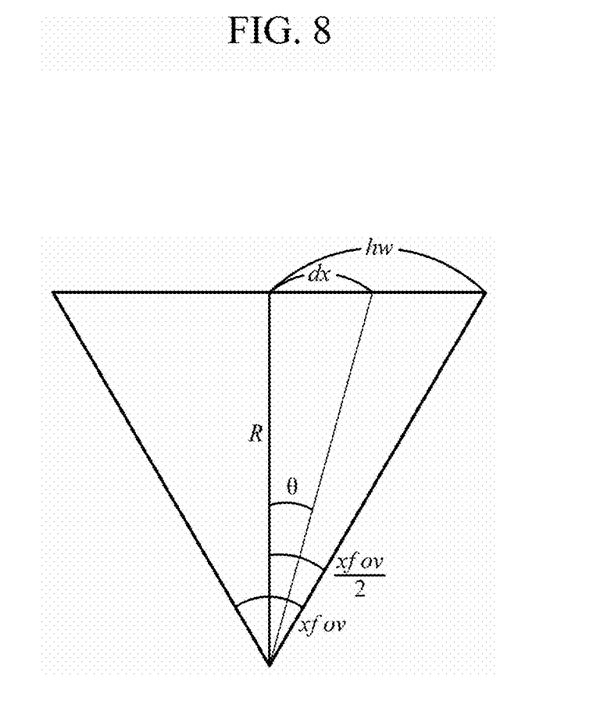
FIG. 8 is a diagram schematically illustrating calculation of a panning angle to be corrected according to a distance.

FIG. 8 is a diagram schematically illustrating calculation of a panning angle to be corrected according to a distance.

The panning angle Ø shown in FIG. 8 may be calculated by [Equation 1] below. In [Equation 1], R is the distance between the PTZ camera 20 and an object of interest as shown in FIG. 8, and x may be defined by [Equation 2] below. Each variable of [Equation 2] may be defined as shown in FIG. 8.

$$\emptyset = \operatorname{atan}\left(\frac{x}{R}\right) \qquad \text{[Equation 1]}$$

$$x = \frac{dx}{hw} \times R \times \tan\left(\frac{xfov}{2}\right) \qquad \text{[Equation 2]}$$

Therefore, the panning angle Ø may be finally calculated by [Equation 3] below.

$$\emptyset = \operatorname{atan}\left(\frac{dx}{hw} \times \tan\left(\frac{xfov}{2}\right)\right) \qquad \text{[Equation 3]}$$

The tilting angle θ may be calculated by [Equation 4] below in the same way as the panning angle Ø.

$$\theta = \operatorname{atan}\left(\frac{dy}{hh} \times \tan\left(\frac{yfov}{2}\right)\right) \qquad \text{[Equation 4]}$$

Subsequently, when zoom-in is requested through the user interface 30, the controller 100 may zoom the PTZ camera 20 whose panning angle P and tilting angle T have been adjusted second and acquires and outputs an enlarged image of the ROI to the user interface 30 (S240).

Figure 9:
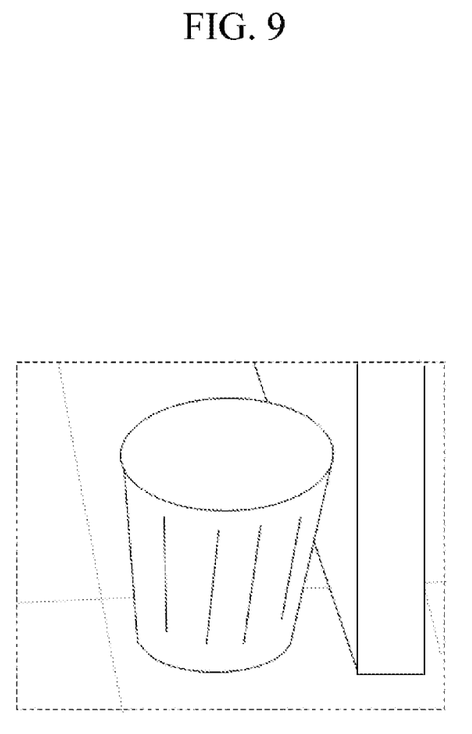
FIG. 9 is a picture showing an example of a zoom-in image captured by a PTZ camera according to an exemplary embodiment of the present invention.

FIG. 9 is a picture showing an example of a zoom-in image captured by a PTZ camera according to an exemplary embodiment of the present invention.

In other words, as shown in FIG. 9, when the panning angle P and the tilting angle T of the PTZ camera 20 are adjusted second, it is possible to acquire an enlarged image of an object of interest desired by a user.

As described above, according to exemplary embodiments of the present invention, it is possible to rapidly and automatically control a PTZ camera by using a fisheye camera image without a complicated calibration process.

Embodiments disclosed herein and illustrated in the drawings are set forth as specific examples only to help understanding and are not intended to limit the scope of various embodiments of the present invention.

Accordingly, the scope of various embodiments of the present invention should be interpreted to encompass all alterations and modifications derived from the technical spirit of various embodiments of the present invention as well as the above-described embodiments.

What is claimed is:

1. A method of controlling a pan-tilt-zoom (PTZ) camera by using a fisheye camera when the fisheye camera and the PTZ camera are adjacently installed, the method comprising:

selecting a region of interest in an entire surveillance-target area image captured by the fisheye camera; and adjusting a panning angle P and a tilting angle T of the PTZ camera to acquire an image of the selected region of interest, wherein the adjusting of the panning angle P and the tilting angle T comprises:

adjusting the panning angle P and the tilting angle T of the PTZ camera first so that an optical axis of the PTZ camera is parallel with an optical axis of the fisheye camera directed to a center of the region of interest; and after the panning angle P and the tilting angle T are adjusted first, adjusting the panning angle P and the tilting angle T of the PTZ camera second on the basis of a distance value between a center of the region of interest in an image captured by the PTZ camera and a center of the PTZ camera image.

2. The method of claim 1, wherein the first adjusting of the panning angle P and the tilting angle T comprises:

de-warping an image having a predetermined range from the center of the region of interest selected in the entire surveillance-target area image captured by the fisheye camera;

calculating a panning angle and a tilting angle of the optical axis of the PTZ camera directed to the center of the region of interest of the fisheye camera from the de-warped image; and adjusting the panning angle P and the tilting angle T of the PTZ camera first so that the optical axis of the PTZ camera is parallel with the optical axis of the fisheye camera directed to the center of the region of interest indicated by the panning angle and the tilting angle.

3. The method of claim 2, wherein the second adjusting of the panning angle P and the tilting angle T comprises:

acquiring a region of interest image captured by the PTZ camera whose panning angle P and tilting angle T have been adjusted first;

detecting the region of interest in the image captured by the PTZ camera by matching the region of interest image to the de-warped image and calculating a distance between a center of the region of interest in the image captured by the PTZ camera and a center of the image captured by the PTZ camera; and adjusting the panning angle P and the tilting angle T of the PTZ camera second on the basis of the calculated distance.

4. The method of claim 1, wherein the first adjusting of the panning angle P and the tilting angle T comprises adjusting the panning angle P and the tilting angle T of the PTZ camera first by considering a difference value between reference coordinates of the fisheye camera stored when the fisheye camera is installed and reference coordinates of the PTZ camera stored when the PTZ camera is installed.

5. A monitoring system comprising:
a fisheye camera configured with a fisheye lens to monitor an entire surveillance-target area;
a pan-tilt-zoom (PTZ) camera installed adjacent to the fisheye camera and configured to closely monitor a specific location of the surveillance-target area; and
a controller configured to have a region of interest selected in an image of the entire surveillance-target area captured by the fisheye camera and adjust a panning angle P and a tilting angle T of the PTZ camera in order to acquire an image of the selected region of interest,
wherein the controller adjusts the panning angle P and the tilting angle T of the PTZ camera first so that an optical axis of the PTZ camera is parallel with an optical axis of the fisheye camera directed to a center of the region of interest and adjusts the panning angle P and the tilting angle T of the PTZ camera second on the basis of a distance value between a center of the region of interest in an image captured by the PTZ camera and a center of the PTZ camera image after the panning angle P and the tilting angle T are adjusted first.

* * * * *